(12) United States Patent
Roetsch et al.

(10) Patent No.: US 8,602,679 B2
(45) Date of Patent: Dec. 10, 2013

(54) CONSTRUCTION MACHINE, IN PARTICULAR ROAD CONSTRUCTION MACHINE, FOR EXAMPLE TANDEM ROLLER, HAVING A VIBRATION-DECOUPLED OPERATOR PLATFORM STRUCTURE AND HAVING A HITCH DEVICE

(71) Applicant: BOMAG GmbH, Boppard (DE)

(72) Inventors: Helmut Roetsch, Beltheim (DE); Matthias Bender, Ellern (DE); Bjoern Hammen, Simmern (DE)

(73) Assignee: BOMAG GmbH, Boppard (DE)

( * ) Notice: Subject to any disclaimer, the term of this patent is extended or adjusted under 35 U.S.C. 154(b) by 0 days.

(21) Appl. No.: 13/747,923

(22) Filed: Jan. 23, 2013

(65) Prior Publication Data

US 2013/0189033 A1 Jul. 25, 2013

(30) Foreign Application Priority Data

Jan. 24, 2012 (DE) .......................... 10 2012 001 348

(51) Int. Cl.
*E01C 19/38* (2006.01)

(52) U.S. Cl.
USPC .............................. 404/117; 404/83; 404/113

(58) Field of Classification Search
USPC ........... 404/83, 102–104, 113, 114, 117, 118, 404/121–123, 125–128
See application file for complete search history.

(56) References Cited

U.S. PATENT DOCUMENTS

| | | | | |
|---|---|---|---|---|
| 3,213,769 A | * | 10/1965 | Smith | 404/110 |
| 4,496,265 A | * | 1/1985 | Fragale | 404/110 |
| 4,643,611 A | * | 2/1987 | Pilachowski | 404/133.1 |
| 5,522,670 A | * | 6/1996 | Gilmore et al. | 404/83 |
| 8,246,107 B2 | * | 8/2012 | Miyasaka | 296/190.03 |
| 2010/0320802 A1 | | 12/2010 | Miyasaka | |

FOREIGN PATENT DOCUMENTS

DE 09206391 U1 8/1992

OTHER PUBLICATIONS

German Patent Office, English Machine Translation of German Patent No. DE9206391 (U1), dated Aug. 27, 1992, retrieved from http:worldwide.espacenet.com on Jan. 23, 2013 (4 pages).

\* cited by examiner

*Primary Examiner* — Raymond W Addie
(74) *Attorney, Agent, or Firm* — Wood, Herron & Evans, LLP

(57) ABSTRACT

The present invention relates to a construction machine having a machine frame and an operator platform structure which is vibration-decoupled in relation to the machine frame via at least one damping element. A hitch device is arranged on the operator platform structure, which is designed for lifting the construction machine. The present invention is characterized in that a limiting device is also provided which limits the maximum load of the at least one damping element upon lifting of the construction machine via the operator platform structure and allows a direct force relay between the operator platform structure and the machine frame while bypassing the damping element. The construction machine is preferably a tandem roller.

17 Claims, 7 Drawing Sheets

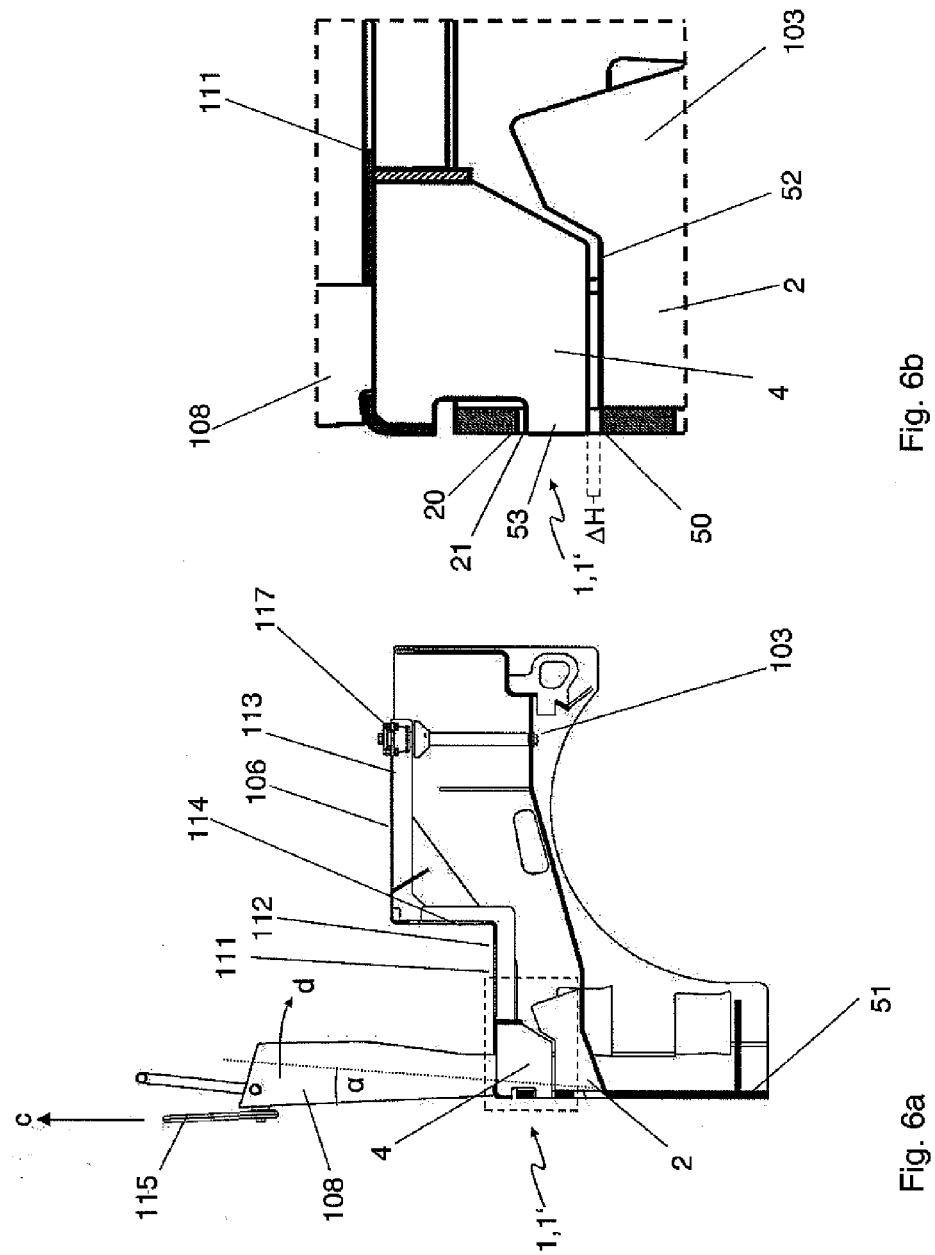

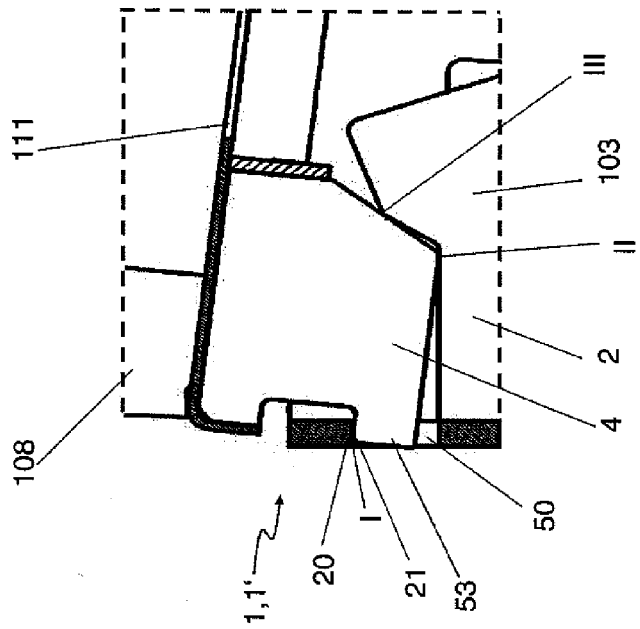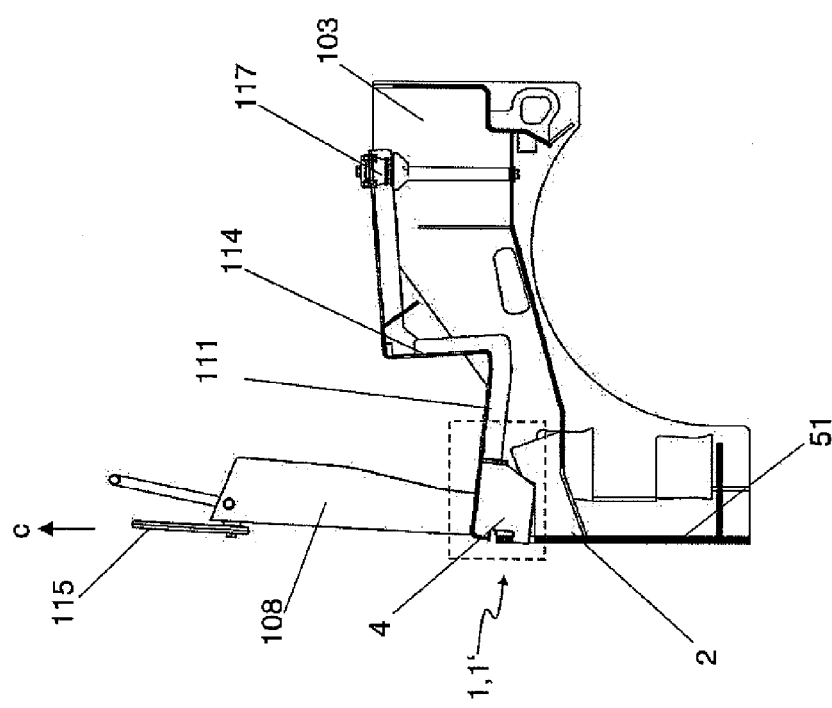

CONSTRUCTION MACHINE, IN PARTICULAR ROAD CONSTRUCTION MACHINE, FOR EXAMPLE TANDEM ROLLER, HAVING A VIBRATION-DECOUPLED OPERATOR PLATFORM STRUCTURE AND HAVING A HITCH DEVICE

CROSS-REFERENCE TO RELATED APPLICATIONS

The present application claims priority under 35 U.S.C. §119 of German Patent Application No. 10 2012 001 348.5, filed Jan. 24, 2012, the disclosure of which is hereby incorporated herein by reference in its entirety.

FIELD OF THE INVENTION

The present invention relates to a construction machine, in particular a road construction machine, having an operator platform structure which is vibration-decoupled in relation to the machine frame using at least one damping element, and having a hitch device or the like for lifting this construction machine, the hitch device being arranged on the operator platform structure.

BACKGROUND OF THE INVENTION

Equipping a construction machine with an operator platform structure (which has, for example, a driver's seat, a steering wheel, and further operating elements for controlling the construction machine) which is vibration-decoupled or elastically decoupled in relation to the machine frame in order to reduce the vibration load on the driver or machine operator, respectively, during working operation, is known. For this purpose, the operator platform as a whole is mounted on at least one damping element, for example, a rubber bearing, on the machine frame. A known construction principle provides an operator platform base plate which is connected via multiple damping elements to the machine frame, and which carries the further components of the operator platform structure. In such arrangements, the base plate is mounted particularly frequently via a total of four damping elements on the machine frame. Vibration damping of the operator platform structure is especially relevant in such construction machines in which at least one oscillating or vibrating working device is provided, for example, such as in tandem rollers having at least one exciter device mounted in at least one drum. The vibration decoupling or vibration damping, respectively, is accordingly implemented in such a manner that it at least damps the transmission of the vibrations which are introduced by the exciter device into the machine, to the operator platform structure.

In construction site operation, situations frequently occur in which a construction machine of this type is to be moved from one location to another location. This is the case, for example, for transport purposes and in construction situations having restricted access and/or tight spatial conditions. In particular in the case of smaller construction machines, for example, up to a total weight of less than 6 tons, the lifting and movement of the construction machine, for example, with the aid of a crane or an excavator, has proven to be particularly useful. The corresponding construction machines frequently have a hitch device for this purpose, in particular a transport shackle or the like, to be able to hitch the construction machine to a lifting device, for example, the chain of a crane. Therefore, transport shackles which are screwed or welded directly onto the machine frame, and to which lifting forces can be applied, are known from the prior art. These transport shackles, however, come with the disadvantage that they can frequently only be arranged at positions on the machine frame which are unfavorable with regard to accessibility and/or force introduction. Furthermore, in the case of lighter construction machines, webbing straps connected directly to the machine frame are known, which, however, must be checked regularly for material integrity, which incurs effort and running costs, in particular if a replacement of the webbing straps is required.

In particular the region of the operator platform structure is ideal for the attachment of the hitch device. It is externally well accessible and frequently lies over or very close to the mass center of gravity of the construction machine, so that lifting by means of a single-point suspension is possible. Direct lifting of the construction machine via the decoupled operator platform itself was hitherto not possible, however. Lifting of the construction machine via the operator platform structure always had the result that the operator platform structure hoisted the machine frame via the at least one damping element, so that substantial traction loads of the at least one damping element occurred. This finally resulted in an overload up to the destruction of the at least one damping element. For example, the transport strap was accordingly guided upward through the operator platform structure, the linkage of the transport strap to the construction machine, however, being performed directly on the frame of the construction machine and not on the operator platform structure mounted on the machine frame. The steering support column of the construction machine is particularly ideally suitable for the attachment of the suspension, since it is very well accessible and is additionally located at the mass center of gravity of the construction machine such that it is suitable for a single-point suspension. However, since the steering support column is also fastened in a vibration-decoupled manner on the operator platform structure in regard to the operating comfort, it was also heretofore not possible for the above-mentioned reasons to implement the suspension on the steering support column.

The present invention is based on the object of providing a construction machine of the type described above, which does not have the disadvantages accompanying the prior art or at least only has them to a reduced extent. In particular, an easily accessible and low-wear possibility is to be specified, for coupling a lifting device to a construction machine to lift and move the construction machine.

SUMMARY OF THE INVENTION

One aspect of the present invention is that a possibility is provided of lifting a construction machine of the generic type via a hitch device arranged directly on the operator platform structure, without the at least one damping element being overloaded. The present invention is based on the finding that, on the one hand, a certain mobility of the operator platform structure in relation to the frame in working operation must be possible to achieve effective vibration decoupling. That is, the operator platform structure must be relatively movable in relation to the frame within a certain range in working operation. On the other hand, this range is typically substantially smaller than the deflection range of the operator platform structure in relation to the frame (at least in the lifting direction of the construction machine) from which irreversible damage to the at least one damping element occurs. The present invention proposes for this purpose that a travel limiting device be provided, which is implemented in such a manner that upon the lifting of the construction machine, it limits the load of the at least one damping element via the hitch device and allows a direct force flow between the operator platform structure and the machine frame. The limiting device is provided such that it limits the relative mobility of the operator platform structure in relation to the machine frame in the lifting direction at least during a lifting movement of the construction machine. An excess traction load of the damping element during lifting of the construction machine is thus prevented.

The (distance) limiting device according to the present invention therefore simultaneously unifies multiple properties. On the one hand, it allows a relative movement between the operator platform structure and the machine frame in a limited range. In this limited range, the at least one damping element can therefore damp the vibration transmission from the machine frame to the operator platform structure. In this case, a bearing force transmission thus occurs from the machine frame to the operator platform structure via the at least one damping element. However, if the damping element is more strongly loaded, for example, upon lifting of the construction machine via the operator platform structure, when the operator platform structure hoists the machine frame via the damping element, the limiting device prevents an excess traction load of the damping element in such a manner that now a direct force flow occurs between the machine frame and the operator platform structure, in particular via parts of the limiting device itself, and an overload of the at least one damping element is thus prevented. The limiting device is implemented in other words in such a manner that starting from the stationary position of the construction machine, it permits a relative movement between the operator platform structure and the machine frame for damping purposes in working operation in a specific range and in the event this range is exceeded at least in the lifting direction, in particular because of a traction strain of the operator platform structure upon lifting of the construction machine, it at least in substantial parts bypasses the at least one damping element for force transmission from the machine frame to the operator platform structure and produces a direct force flow between the machine frame and the operator platform structure. As a whole, the limiting device therefore represents a means for travel limiting of the displacement travel between the operator platform structure and the machine frame at least in the lifting direction of the construction machine, the travel limiting being implemented in such a manner that the possible displacement range is less than a displacement which damages the at least one damping element beyond the typical wear, because of an excess traction force load. Therefore, the present invention allows an attachment of the suspension of a construction machine directly to the operator platform structure, or even directly on the steering support column, which is particularly well suitable for lifting the construction machine because of its location in the mass center of gravity, although the operator platform structure and the steering support column are arranged in a vibration-decoupled manner on the machine frame.

Fundamentally, many various specific embodiments of the limiting device come into consideration in this case. The limiting device is ideally arranged, for example, at least partially between the machine frame and the operator platform structure. This positioning of the limiting device is advantageous in that movement limiting between the machine frame and the operator platform structure can be implemented particularly effectively there.

The specific implementation of the limiting device can also be varied in a broad range, as long as the above-described effects of the limiting device are still maintained. To allow high functional reliability, the limiting device preferably operates solely mechanically, non-mechanical steps and/or means fundamentally also being possible, which the present invention also comprises. The limiting device can comprise, for example, a formfitting coupling, which is active in particular between the machine frame and the vibration-decoupled operator platform structure, and which, when the construction machine is lifted via the hitch device, allows the direct force flow between the operator platform structure and the machine frame via the formfitting coupling while avoiding a further load of the damping element by inducing a form fit. A formfitting coupling is characterized in general according to one embodiment of the present invention in that it comprises two elements, which can be detachably moved into a form fit with one another, with, in the formfitting state, a direct force transmission occurring from the machine frame to the operator platform structure (via the formfitting coupling, if it is not part of the machine frame and the operator platform structure itself) at least in the lifting direction of the construction machine. Through the direct force flow between the operator platform structure and the machine frame, which is made possible via the formfitting coupling in the load state, a lifting force applied to a hitch device designed as a transport shackle, for example, which is fastened on the operator platform structure, can be introduced directly into the machine frame while bypassing the damping elements. In the normal operating state of the construction machine, the formfitting coupling is not engaged, whereby the operator platform structure is elastically decoupled from the machine frame in a known manner and vibrations occurring in the machine frame are damped in relation to the operator platform structure by the at least one damping element.

The central components of the formfitting coupling are therefore at least two elements designed for the form fit. The form fit can be produced via an engagement of one element in the other element, as is the case with appropriately formed claws, for example. However, formfitting elements which are obtained by a suitable stop, against which the other element strikes, at least in one movement direction, and is thus prevented from continuing the displacement movement, are particularly functionally reliable and simple to produce. The formfitting coupling of the construction machine according to the present invention therefore preferably has at least one first stop and at least one second stop or one stop element, which are formed in relation to one another in such a manner that the second stop strikes on the first stop upon lifting of the construction machine and prevents a further relative movement of the operator platform structure to the machine frame in the lifting direction. This type of the formfitting coupling therefore acts essentially through displacement travel limiting of one stop in relation to the other stop in the lifting direction of the construction machine. The lifting direction of the construction machine for the individual elements of the construction machine, in particular machine frame and operator platform structure, is the direction in which the respective elements move upon lifting of the machine, in particular also toward one another. One stop can be a passage opening, for example, and the other stop can be a stop bolt guided through the passage opening. The terms stop and stop element are to be understood as substantially functional in the present case and overall designate two elements which strike on one another upon lifting of the construction machine and each comprise a stop.

It is ideal if the formfitting coupling comprises one stop on the operator platform structure and one stop or counter stop, respectively, on the machine frame and these strike directly on one another. However, it is also possible that one stop is provided in each case on both the operator platform structure and also on the machine frame, which can be functionally coupled to one another via an intermediate element. In this case, the formfitting coupling further comprises at least the intermediate element, which is designed to strike against both stops upon lifting of the construction machine and thus, strictly speaking, allows a double form fit (stop of machine frame to intermediate element and intermediate element to stop of operator platform structure) and blocks a further relative movement of the operator platform structure to the machine frame in the striking state. In this embodiment, the formfitting elements which are arranged on the machine frame and on the operator platform structure therefore do not strike directly against one another, but rather respectively on the intermediate element, which accordingly functions as a bridge element between the formfitting elements of the machine frame and the operator platform structure. The force flow between the machine frame and the operator platform structure upon lifting of the construction machine therefore occurs via the intermediate element when the form fit is produced.

At least one stop of the machine frame and/or the operator platform structure is preferably integrated into a holding leg, which protrudes from the respective support part (the part which carries the holding leg). The holding leg, which is fixedly connected to the machine frame or the operator platform structure, is thus substantially distinguished in that it spatially protrudes from the operator platform structure or from the machine frame and, on the other hand, as part of the formfitting coupling it fulfills a holding function for the travel limiting of the relative movement between the machine frame and the operator platform structure. For this purpose, a bolt passage opening is preferably integrated in the holding leg, through which a stop bolt can be guided. It is ideal if a holding leg respectively having a bolt passage opening is arranged in each case on both the operator platform structure and also on the machine frame so that they at least partially overlap, both bolt passage openings being arranged overlapping one another at least in a subregion. The latter allows a linearly extended intermediate element, in particular a stop bolt, to be guided through both bolt passage openings. The displacement travel limiting is obtained via the stop bolt guided through both bolt passage openings in such a manner that it (second stop) strikes against the edge of at least one bolt passage opening (first stop) upon lifting of the construction machine. In this manner, particularly efficient limiting of the maximum traction load on the at least one damping element upon lifting of the construction machine is achieved. The stop bolt is further preferably arranged in such a manner that its bolt axis extends perpendicularly to the force direction of the lifting force, so that substantially shear forces load the stop bolt in the formfitting state. The bolt axis accordingly preferably extends in a horizontal plane.

The diameter of at least one bolt passage opening is preferably designed to be greater than the diameter of the stop bolt guided through the bolt passage opening, so that the bolt is mounted so it has limited mobility in this bolt passage opening (at least in the plane of the bolt passage opening) and only strikes against the edge of the bolt passage opening upon lifting of the construction machine. The form fit is obtained by this striking and a further displacement movement of the operator platform structure in relation to the machine frame upon lifting of the construction machine is prevented. The diameter of the respective bolt passage opening is particularly preferably designed to be peripherally larger than the diameter of the stop bolt. In this manner, a relative movement between the machine frame and the operator platform structure is possible in particularly many spatial directions and at least from the middle position in all directions in the plane of the bolt passage opening, which allows effective vibration damping by the at least one damping element. The gap width between the stop bolt and the inner wall of the bolt passage opening is the decisive factor for establishing how far the operator platform structure is relatively movable in relation to the machine frame. The gap width is fundamentally to be dimensioned such that, on the one hand, the damping procedure for vibration decoupling by the formfitting coupling is not obstructed and, on the other hand, the form fit occurs in a timely manner before an overload of the at least one damping element upon lifting of the construction machine. In practical use, the gap width is frequently a few millimeters and is in the range from 1 to 10 mm for a tandem roller, for example.

Fundamentally, the specific design of the bolt passage opening can be varied in many ways. A circular or disc-like embodiment is ideal, for example. However, it can frequently be desirable for various relative positions to be possible between the machine frame and the operator platform structure or at least elements thereof. In this context, the use of one or more bolt passage openings which have a contour like a keyhole or a dumbbell has proven itself. Relative movements of the stop bolt in the longitudinal direction of the bolt passage opening are thus possible, without simultaneously shrinking or even eliminating the gap required for the vibration decoupling in working operation. Therefore, for example, two round hole recesses are connected to one another via an oblong slot in the case of the use of a dumbbell-shaped bolt passage opening. In both positions in which the stop bolt is guided through one of the two bolt passage openings, which are ideally of equal size, the same displacement range thus results, within which damping and no form fit still occurs.

The use of a stop bolt in the formfitting coupling of the travel limiting device is not required, however. Alternatively, for example, it is also possible that it comprises at least one first stop on the machine frame and at least one second stop on the operator platform structure which are designed to at least partially overlap one another in the lifting direction. Therefore, at least two superimposed stops are provided on the operator platform structure and on the machine frame in such a manner that they come into contact with one another upon lifting of the construction machine, the stop or the stop element of the machine frame then resting on the stop of the operator platform structure. Through this arrangement, the formfitting coupling can be further simplified and moreover can be designed to be more loadable, since an intermediate element, for example, a stop bolt, can be omitted here. For the specific implementation of this refinement, a broad spectrum of design alternatives can fundamentally be used. However, it is preferable if the travel limiting device and in particular the formfitting coupling has a stop in the form of a passage opening, in particular in the machine frame, and a stop element in the form of a stop lug, in particular on the operator platform structure, the stop lug at least partially protruding into the stop opening substantially transversely to the lifting direction of the construction machine. Alternatively, it is also possible to provide the location of the stop lug in the machine frame and that of the passage opening in the operator platform structure. In the present case, a stop lug summarizes anything which is capable of engaging in and ideally even engaging through the passage opening. The stop lug and the passage opening are further preferably formed in one piece with the operator platform structure and the machine frame, whereby, on the one hand, the number of the required parts can be reduced and, on the other hand, the carrying capacity of the travel limiting device can typically be increased.

Fundamentally, the provided stop elements are preferably formed at least in pairs, so that upon lifting of the construction machine, the travel limiting device and in particular the formfitting coupling simultaneously perform the lifting force transmission at multiple points of the formfitting coupling.

The travel limiting device and in particular the formfitting coupling is preferably designed such that upon lifting of the construction machine, the form fit occurs automatically or independently, with active actuation of the formfitting coupling by the operator of the construction machine also being possible though. However, the first has the advantage that the relief effect of the at least one damping element which is achieved by the formfitting coupling according to the present invention occurs independently of human activity and is therefore particularly operationally reliable. The formfitting coupling is further preferably designed such that it automatically engages upon reaching a fixed maximum displacement of the operator platform structure in relation to the machine frame at least in the lifting direction of the construction machine. The maximum displacement is for logical reasons fixed in such a manner that damage of the at least one damping element still does not occur upon reaching it.

The limiting device according to the present invention and in particular the formfitting coupling and the direct force flow thus made possible between the operator platform structure and the machine frame or the force flow between the operator platform structure and the machine frame while avoiding a further load of the at least one damping element allow the arrangement of at least one hitch device, in particular a transport shackle, on the operator platform structure or at least in fixed connection to the operator platform structure and therefore at an attachment point which is favorable with regard to accessibility, force introduction (in particular in regard to resulting tilting torques), and/or resulting force flow. A transport shackle or the like is understood as a machine element to which a traction force or lifting force can be applied. For this purpose, the transport shackle can have, for example, one eye or multiple eyes, in which a crane hook or the like can engage. A preferred embodiment of the construction machine according to one embodiment of the present invention provides that it only has one single transport shackle, this single transport shackle being arranged on the vibration-decoupled operator platform structure. Through the single-point suspension resulting therefrom, very simple handling is possible during lifting, loading, or the like.

Preferably the hitch device, in particular the transport shackle, is arranged on a steering support column associated with the operator platform structure. The steering support column is the part connected to the base plate of the operator platform structure on which the steering wheel or further steering device is arranged on the construction machine. The steering support column frequently projects upward in substantial parts like a column in the vertical direction from the base plate and has a steering wheel and/or further operating element, for example, a dashboard, in its upper region. The transport shackle is therefore advantageously arranged on a component which is provided on the construction machine in any case and is positioned exposed, so that no additional parts are to be provided for attaching the transport shackle on the construction machine according to one embodiment of the present invention. Through the arrangement of the transport shackle on the steering support column, the steering support column being able to be arranged substantially centrally in particular in relation to the length and/or width of the construction machine, for example, the force engagement point can be moved closer to the center of gravity and ideally in the vertical direction above the center of gravity of the construction machine with respect to the avoidance of resulting tilting torques, but this does not necessarily have to be the case. Thus, only a single hitch device, in particular transport shackle, is necessary to couple a lifting device to the construction machine. It has been shown that an arrangement of the hitch device in such a manner that the force engagement point for the lifting device in the horizontal plane is in a circle of less than 100 mm and in particular less than 60 mm and ideally over the mass center of gravity of the construction machine provides optimum results.

The hitch device, in particular the transport shackle, can furthermore be arranged so it is displaceable, for example, pivotable and/or foldable, on the operator platform structure and in particular on the steering support column. In this manner, the hitch device can be removed from the field of vision of the operator of the construction machine in working operation when it is not required.

The advantageous effects of the present invention become particularly clear if the construction machine is a tandem roller, in particular having an operating weight of up to 6.0 tons, preferably up to 5.0 tons.

BRIEF DESCRIPTION OF THE DRAWINGS

The present invention will be explained in greater detail hereafter on the basis of the schematic figures as an example and in a nonrestrictive manner. Identical parts or at least identically acting parts are designated with the same reference signs. In the figures:

FIGS. 6a and 6b show a cross-sectional view and detail enlargement through the operator platform structure and the machine frame from FIG. 5 in the operating position; and FIGS. 7a and 7b show a cross-sectional view and detail enlargement through the operator platform structure and the machine frame from FIG. 5 in the lifted position.

DETAILED DESCRIPTION OF THE INVENTION

Figure 1:
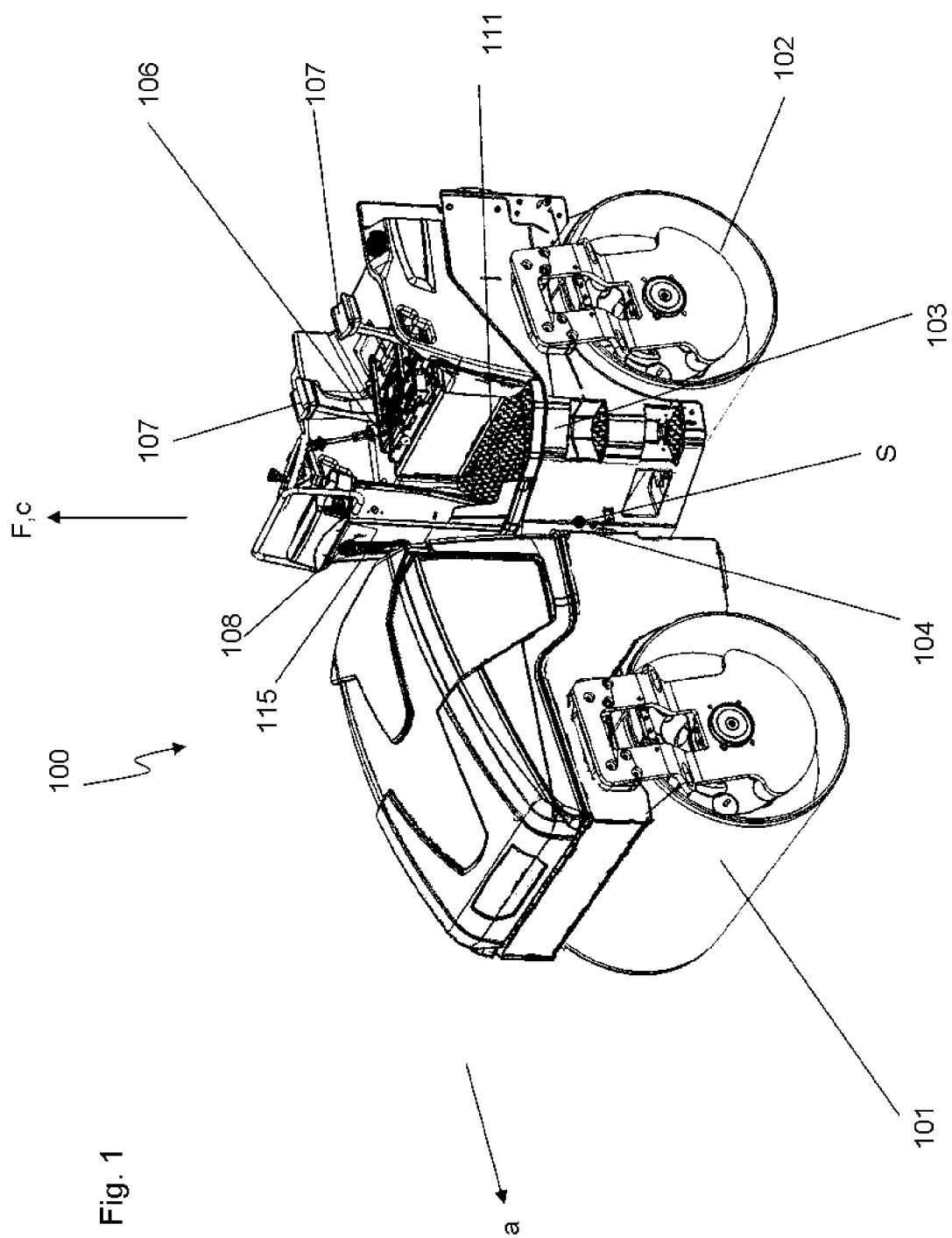
FIG. 1 shows a perspective diagonal view of a tandem roller.

FIG. 1 shows a tandem roller 100 as an example of a self-propelled construction machine. The tandem roller 100 has a front drum 101 and a rear drum 102, which are mounted on a machine frame 103. The machine frame 103 comprises two machine frame segments connected to one another via an articulated joint 104, one segment carrying the front drum 101 and the other segment carrying the rear drum 102. The segment which lies in front in the forward direction a also has a hood, while in contrast an operator platform structure 106 is arranged on the rear segment of the machine frame 103.

In working operation, the operator is seated on the operator platform structure 106, the seat typically provided there not being shown in the present case for reasons of clarity. However, the two arm rests 107 are visible. Furthermore, the operator platform structure 106 comprises a steering support column 108 protruding in the vertical direction, on whose upper end a steering wheel and a dashboard are arranged. Further details on the operator platform structure 106 are shown in particular in FIG. 2.

Figure 2:
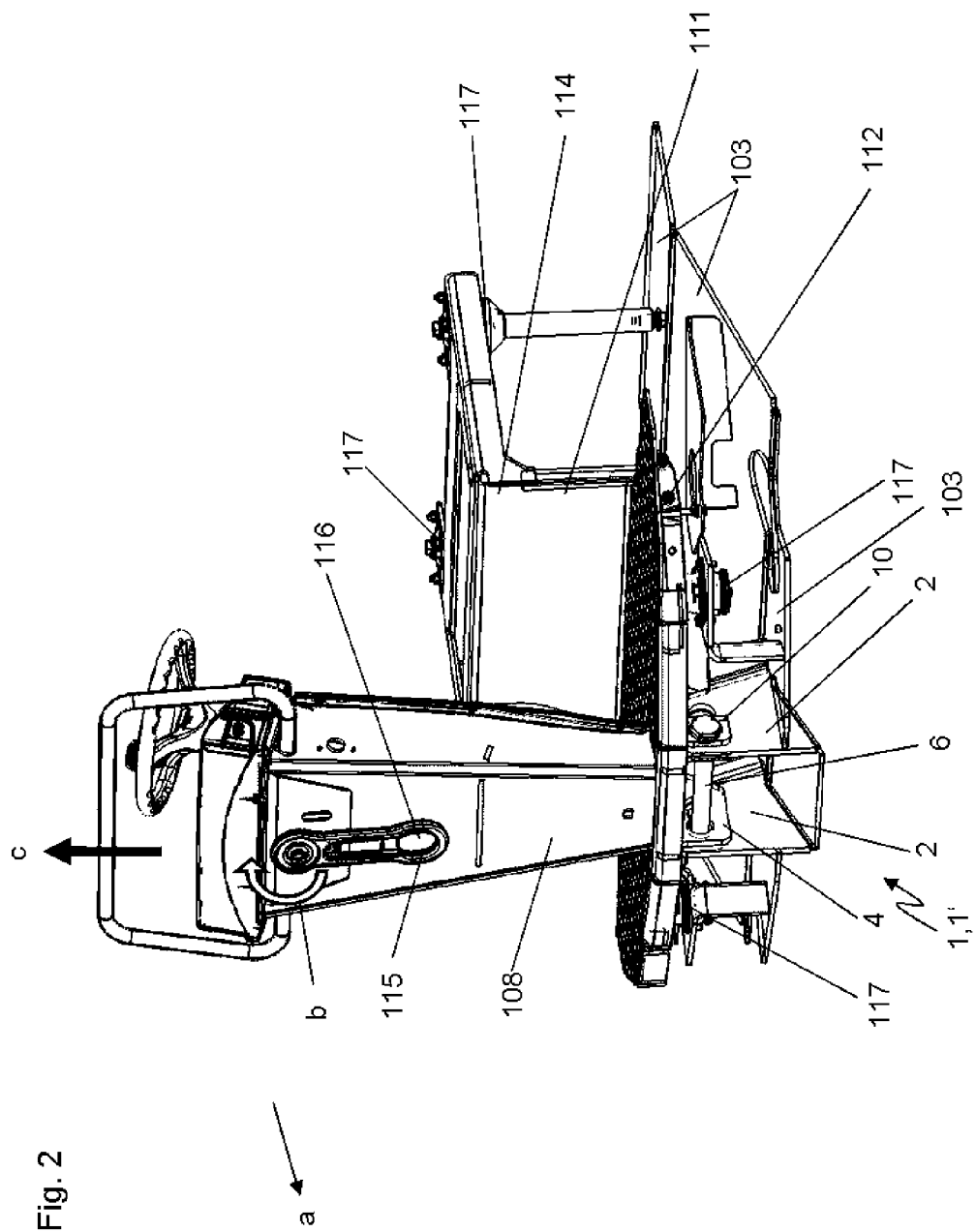
FIG. 2 shows a perspective diagonal view of the bearing device between machine frame and operator platform structure from FIG. 1.

FIG. 2 illustrates the fundamental structure of the operator platform structure 106 and its mounting on the machine frame 103 of the tandem roller 100. The supporting element of the operator platform structure 106 is a floor plate or base plate 111, which in the present case comprises a horizontal foot region 112 (having attached footboard), a horizontal seat region 113 offset upward thereto in the vertical direction, and a connection region 114, which is obtained in the form of a vertical wall and connects the regions 112 and 113, the parts 112, 113, and 114 being designed as fixedly coherent, ideally in one piece, and forming the floor plate 111 in their entirety. Further elements of the operator platform structure are arranged on the floor plate 111, for example, the seat (not shown in greater detail) in the rear region and the steering support column 108. The steering support column protrudes upward in the vertical direction and projects in this direction beyond the foot region 112. In addition to the steering wheel and the dashboard, a hitch device designed as a transport shackle 115 is also arranged on the steering support column 108. FIG. 2 shows the transport shackle 115 in its pivoted-down position. For transport purposes, the transport shackle 115 can be pivoted upward in the arrow direction b. For hanging on a crane chain, for example, the transport shackle 115 has a transport eye 116, through which a corresponding hook, which is connected to a crane, for example, or the like can be threaded. The steering column support 108 is fixedly connected to the floor plate 111 of the operator platform structure 106. Of course, for example, it is also possible to design the transport eye 116 to be mounted stationary on the steering support column 108.

The operator platform structure 106 is mounted on the machine frame 103, the mounting being vibration-damped or vibration-decoupled, respectively (i.e., the vibrations occurring on the machine frame 103 are not relayed one-to-one, but rather in damped form, if at all, to the operator platform structure 106). In particular the vibrations developed in working operation via the exciter units of the two drums 101 and 102 are therefore transmitted in damped form, if at all, to the base plate or floor plate 111 and to the entire further operator platform structure 106. For this purpose, the floor plate 111 is mounted via a total of four damping elements 117 on the machine frame 103, which is also designed as stepped in this region (FIG. 2 only shows the part of the machine frame 103 opposite to the floor plate 111). The specific damping elements 117 are suitable rubber elements, by whose elastic deformability a relative movement of the operator platform structure 106 in relation to the machine frame 103 for vibration damping is made possible. In operation of the tandem roller 100, the damping elements 117 ensure elastic decoupling of the operator platform structure 106 in relation to the machine frame 103 in a specific range. The steering support column 108 protruding from the base plate 111 is welded to the base plate 111.

The center of gravity of the tandem roller 100 is coarsely indicated with S in FIG. 1 and lies substantially below the transport shackle 115 in the vertical direction. Through this balancing, it is possible to lift the tandem roller 100 via a single-point suspension on the transport shackle 115, without the tandem roller 100 moving into a severe imbalance. The vertical force engagement line of the lifting force F (or its extension) extends substantially through the center of gravity S of the tandem roller 100, because of which the tandem roller 100 does not tilt upon lifting. Because the transport shackle 115 is fastened on the steering support column 108, which is provided on the tandem roller 100 in any case and is favorable in relation to the force engagement point of the lifting force F, no additional structural components are required for attaching the transport shackle 115.

Upon lifting of the tandem roller 100, the entire weight of the tandem roller is loaded on the transport shackle 115. In order to prevent the damping elements 117 from being loaded or overloaded, respectively, with the entire weight of the machine frame 103 and the elements hanging on it further away from the damping elements 117 (for example, drums including exciter unit) (in the exemplary embodiment in this specific case, this could mean weight loads of the damping elements 117 of a total of more than 4 tons), a travel limiting device 1 in the form of a formfitting coupling 1' is provided, which represents a displacement travel limiting of the operator platform structure 106 in relation to the machine frame 103 in the lifting direction c and allows a force redirection of the traction forces which load the damping elements 117 upon lifting of the construction machine 100 to the formfitting coupling 1', which can be loaded significantly more.

The fundamental structure of the travel limiting device is further shown in particular in FIGS. 2 to 7b, FIGS. 2 to 4 and FIGS. 5 to 7b relating to two merely exemplary different alternative embodiments.

Firstly, the alternative embodiments specified in greater detail in FIGS. 2 to 4 will be described. The formfitting coupling 1' is arranged between the operator platform structure 106 and the machine frame 103, the essential elements of the formfitting coupling 1' lying nearly on a vertical line with the center of gravity S and the transport shackle 115 in the present exemplary embodiment. The formfitting coupling 1' will only become active upon lifting of the tandem roller 100, but does so automatically and independently then, and allows a direct force flow between the operator platform structure 106 and the machine frame 103 while bypassing the damping elements 117. It is thus ensured that the load of the damping elements 117 upon lifting of the construction machine is not greater than their maximum load. Upon lifting of the construction machine 100 in the lifting direction c, the provided maximum deflection of the operator platform structure 106 in relation to the machine frame 103 is achieved, the traction load of the damping elements 117 at this point also being maintained with activated formfitting coupling. The maximum deflection is fixed by the design of the formfitting coupling 1'. However, this traction load is substantially less than the lifting force required for lifting the construction machine and is therefore negligible. Upon lifting of the construction machine 100, the formfitting coupling 1' therefore takes over the force relay between machine frame 103 and operator platform structure 106 while avoiding an overload of the damping elements 117. The formfitting coupling 1' accordingly prevents damage to the damping elements 117, which are not designed for high traction forces as a result of their structure, and additionally allows a substantially deflection-free force flow between the operator platform structure 106 or the steering support column 108 and the machine frame 103.

The essential elements of the formfitting coupling 1' according to one embodiment are holding legs 2, which protrude from the machine frame 103, each having a bolt passage opening 3, which are arranged coaxially to one another, the holding legs 4, which protrude from the floor plate or base plate 111 of the operator platform structure 106 toward the machine frame 103, each having a bolt passage opening 5, the holding legs 2 and 4 each being provided in pairs and being designed as respectively overlapping in the horizontal direction in one direction (bolt insertion direction; transverse to the forward direction), and a stop bolt 6, which is guided through the bolt passage openings 3 and 5. In the axial direction of the bolt 6, the stop bolt 6 protrudes beyond the holding leg 2 on the machine frame 103 which lies on the outside in the axial direction on both sides and is secured on both sides against a displacement in the axial direction (specifically via suitable disk elements 10 and/or screw heads 8 and 9, whose diameter is greater than the diameter of the bolt passage openings 3 of the holding legs 2).

Figure 3:
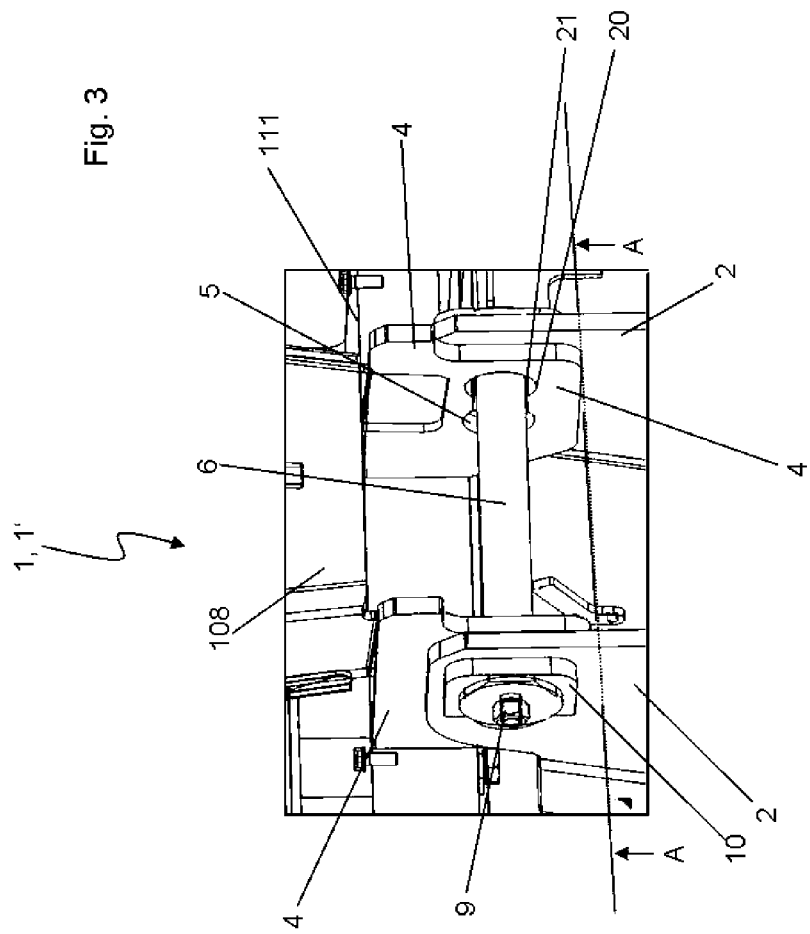
FIG. 3 shows a detail enlargement of the region of the formfitting coupling from FIG. 2.
Figure 4:
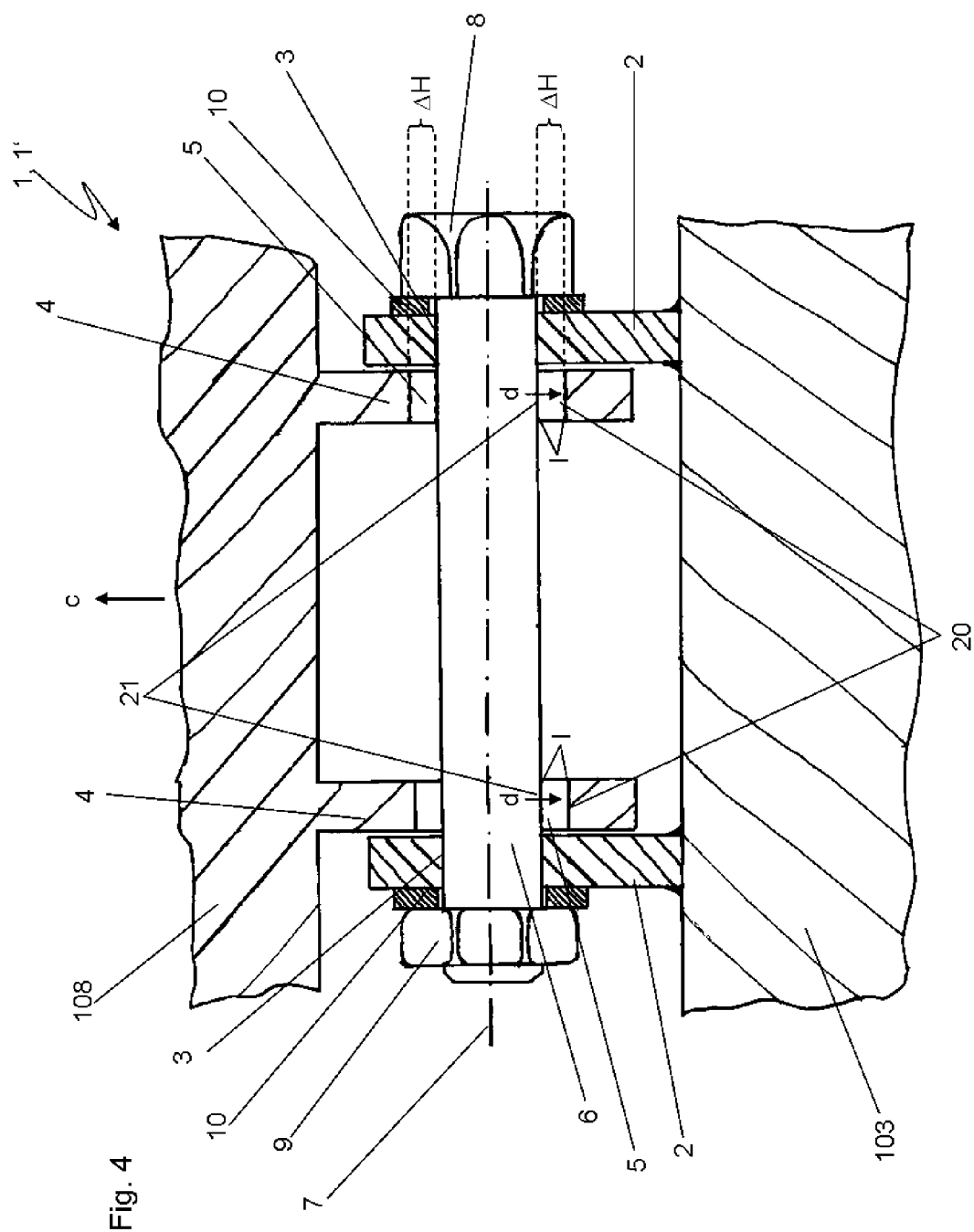
FIG. 4 shows a sectional view through the formfitting coupling from FIG. 3.

FIGS. 2, 3, and 4 respectively show the formfitting coupling 1' in the decoupled state, for example, when the tandem roller 100 stands on the ground. The stop bolt 6 can move freely within the bolt passage openings 5, in particular in the vertical direction (and in the present case also in the horizontal direction), and is ultimately only secured against axial displacement. The bolt passage opening 5 is therefore peripheral to the stop bolt 6 at a distance. The stop bolt 6 is fixed in the vertical direction in the bolt passage opening 3, in contrast, and is fixedly mounted in this guide. The location of the operator platform structure 106 or the floor plate 111, respectively, in relation to the machine frame 103 is substantially ensured by the damping elements 117, which elastically hold the operator platform structure 106 in position on the machine frame 103. The formfitting coupling 1' is designed in such a manner that the stop bolt 6 extends centrally through the bolt passage openings 5 in the rest state of the stationary construction machine 100. In this manner, it is ensured that damping of the operator platform structure 106 in relation to the machine frame 103 via the damping elements 117 is possible both in the vertical direction and also in and opposite to the working direction.

Upon lifting of the tandem roller 100 in the lifting direction c (for example, by pulling on a crane hook engaged in the transport shackle 115), the operator platform structure 106 is first lifted, at least in the range of the formfitting coupling 1', in a limited displacement range relative to the machine frame 103. This relative movement occurs until the stop bolt 6 strikes against the lower opening edges of the bolt passage openings 5, as indicated by the arrows d in the cross-sectional view from FIG. 4. The edge of the bolt passage opening 5 therefore forms, in the lifting direction c, a first stop 20 in relation to the second or counter stop 21 formed by the stop bolt 6. The stop point is designated with I in FIG. 4. The limits of this displacement range are fixed by the distance $\Delta H$ of the stop bolt 6 to the respective stops on the bolt passage openings 5 in the lifting direction c. The narrower $\Delta H$, the earlier the form fit occurs and vice versa. As soon as the stop element or the second stop 21 (specifically the stop bolt 6) of the formfitting coupling 1' strikes against the first stop 20 (specifically the edge region of the bolt passage openings 5) and produces a form fit, a continuation of the relative movement between the machine frame 103 and the operator platform structure 106 in the lifting direction c is blocked by the formfitting coupling 1'. The lifting force F applied to the transport shackle 115 can then be introduced directly into the machine frame 103 via this form fit while bypassing the damping elements 117. The form fit which can be caused by the formfitting coupling 1' can thus also be designated as a direct form fit between the operator platform structure 106 and the machine frame 103.

Similarly, the formfitting coupling 1' can also be used as a tear-off safeguard for the operator platform structure 106 in the event of occurring extreme loads in operation of the construction machine, which is designed in the present case as the tandem roller 100. This can be a significant safety aspect. Furthermore, the formfitting coupling 1' can also be used as a mechanical stop element, which, for example, to protect the damping elements 117, limits the maximum vibration travel of the operator platform structure 106 relative to the machine frame 103, the stop bolt 6 being able to strike both on the upper edges and also the lower edges of the bolt passage openings 5.

Further details of the present invention, in particular in regard to the construction and the mode of operation of the formfitting coupling 1', are also shown in particular in the cross-sectional view of the formfitting coupling 1' from FIG. 4, the stop bolt 6 having its frontal end sections being shown in a non-sectional manner. FIG. 4 is a sectional view along section line A-A from FIG. 3. FIG. 4 illustrates in particular the arrangement of the stop bolt 6 and its relative position and mode of operation as a stop element (second stop 21) to the bolt passage openings 3 and 5 arranged in the holding legs 2 and 4. The bolt axis of the stop bolt 6 extends in the horizontal plane and perpendicularly to the lifting direction c. The stop bolt 6 is guided through the two bolt passage openings 3 of the holding legs 2, which are fixedly connected to the machine frame 103, and through the bolt passage openings 5 of the holding legs 4, which are fixedly connected to the floor plate 111 of the operator platform structure 108, and protrudes on both sides in the axial direction beyond each of the outer sides of the holding legs 2. On the end face, a bolt head 8 and a nut 9 screwed onto the stop bolt 6 are provided, which respectively press against a lock washer 10. The stop bolt 6 is accordingly installed in the formfitting coupling 1' such that it can be easily removed. The lock washers 10 are dimensioned such that they are larger in diameter than the bolt passage openings 3 and 5, whereby the stop bolt 6 as a whole is secured against axial displacement. The bolt longitudinal axis 7 therefore extends horizontally and perpendicularly to the force engagement line of the lifting force in the lifting direction c. A further essential feature of the formfitting coupling 1' is that the cylinder outer shell of the stop bolt 6, in the operating position shown in FIG. 4 (i.e., the tandem roller 100 stands on the ground and can be or is operated), is spaced apart at the distance $\Delta H$ from the edge of the bolt passage openings 5 in the radial direction to the bolt axis 7. The distance $\Delta H$ is obtained due to the diameter of the stop bolt 6 being smaller by the amount $2*(\Delta H)$ than the diameter of the bolt passage openings 5, which have the same dimensions in the present case. In other words, the stop bolt does not press against the bolt passage opening 5, so that the operator platform structure 108 is movable in relation to the machine frame 103.

The mode of operation of the formfitting coupling will also be described in greater detail hereafter on the basis of the cross-sectional illustration from FIG. 4. If the tandem roller 100 is lifted via the transport shackle 115 in the lifting direction c, a relative movement of the operator platform structure 108 in relation to the machine frame 103 in the direction c first occurs, the stop bolt 6 approaching the respective edge of the bolt passage opening 5 in the arrow direction d. As soon as the stop bolt 6 strikes against the respective edge (and therefore a form fit is obtained at the stop point I between the first stop 20 and the second stop 21) and therefore a form fit automatically occurs in the formfitting coupling 1' upon lifting, the force relay of the lifting force occurs directly via the formfitting coupling 1' (specifically in the following manner: machine frame 103—holding leg 2—stop bolt 6—holding leg 4—operator platform structure 108—transport shackle 115). It is therefore essential that in the lifted position the operator platform structure 108 presses directly against the machine frame 103 via the stop point I obtained via the contact of the second stop 21 on the first stop 20 and therefore a traction force transmission is obtained while bypassing the damping elements 117. The stop bolt 6 is essentially loaded with shear. As soon as the tandem roller 100 is placed back on the ground, the formfitting coupling 1' automatically disengages again and the damping elements 117 can assume their bearing and damping function again.

Figure 5:
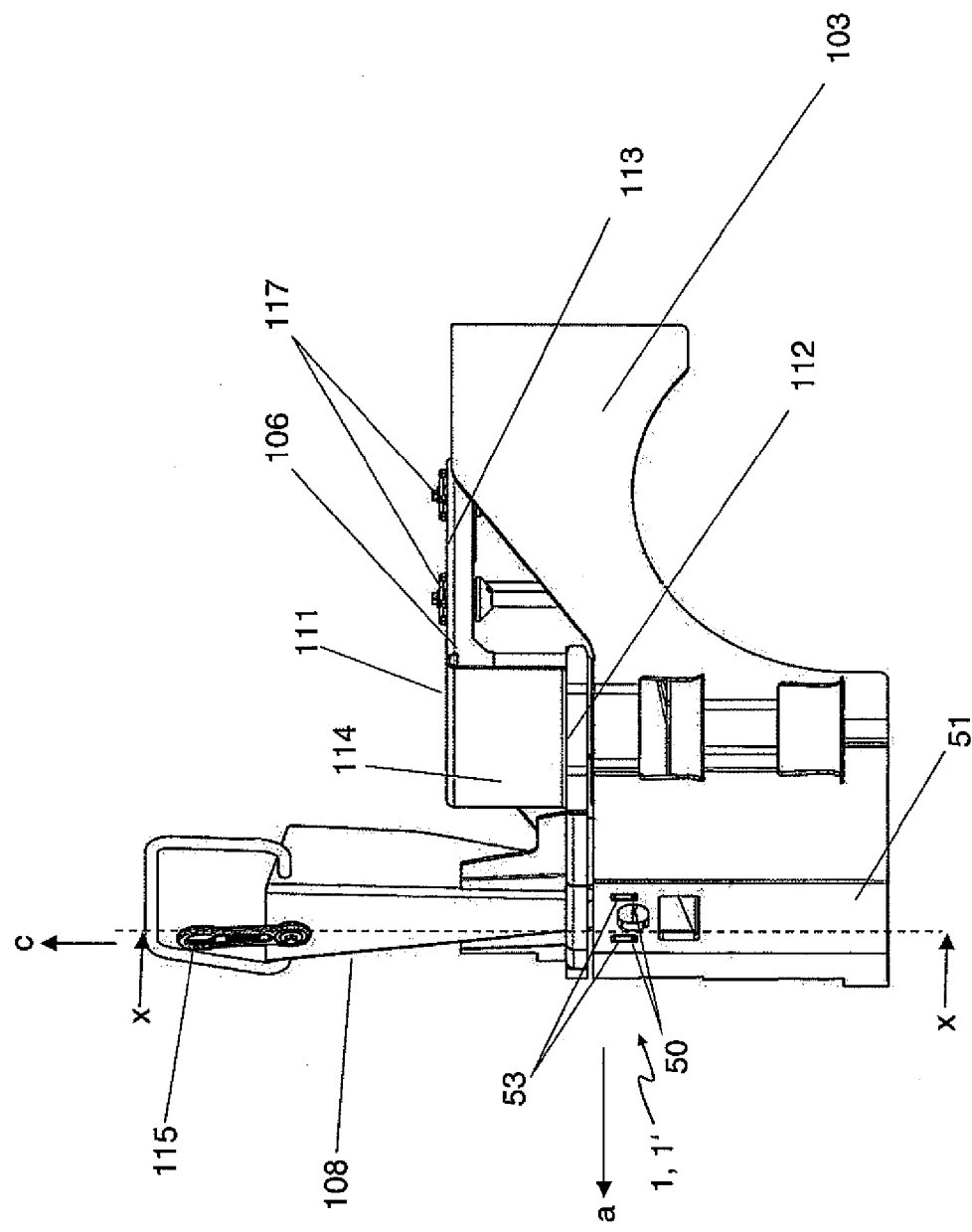
FIG. 5 shows a perspective diagonal view of an alternative embodiment of a bearing device between machine frame and operator platform structure.

FIGS. 5 to 7b relate to an alternative design of the formfitting coupling 1', only the differences being described hereafter and otherwise reference being made to the above statements with respect to the construction and the mode of operation of the formfitting coupling 1' and the further elements of the construction machine 100. Like FIG. 2, FIGS. 5 to 7b only show a part of the construction machine 100 from FIG. 1, specifically the machine frame 103 (rear segment) and the operator platform structure 106 installed on the machine frame 103. FIG. 5 is a perspective diagonal view, FIG. 6a is a sectional view through FIG. 5 along section plane x-x (section plane in the vertical direction and in the longitudinal direction or opposite to direction a through FIG. 5), FIG. 7a is a sectional view through FIG. 5 in the lifted state and FIGS. 6b and 7b are respectively detail enlargements of the region framed by dashed lines from FIGS. 6a and 7a, which illustrate in particular the construction and the mode of operation of the formfitting coupling 1' between the operator platform structure 106 and the machine frame 103.

The essential difference in the construction of the formfitting coupling 1' is that the embodiment shown in FIGS. 5 to 7b does not have separate stop bolts, but rather solely elements which are formed integrally or in one piece with the machine frame 103 and the operator platform structure 106, and which also form in particular the first stop 20 and the second stop 21 of the formfitting coupling 1'. The machine frame 103 and the operator platform structure 106 are designed in other words in such a manner that they jointly and without additional elements form the formfitting coupling 1' in the installed state. The required stops 20 and 21 of the formfitting coupling 1' are respectively designed integrally and in one piece with the operator platform structure 106 or the machine frame 103.

The formfitting coupling 1' according to the embodiment in FIGS. 5, 6a, 6b, 7a, and 7b comprises two holding legs 2', which are arranged adjacent to one another on the machine frame 103 and protrude from the machine frame 103 in the region of the steering column 108, and which respectively open into a passage opening 50 in a front plate 51 of the machine frame 103 in relation to their top side in the forward direction a. The holding legs 2 therefore extend in the forward direction a in the horizontal plane from a region located inside the machine frame 103 up to the edge of the machine frame 103 and each open at their top side into the passage opening 50. The top side 52 of the holding legs 2 is designed as a support surface in the manner described in greater detail hereafter. The counter element of the formfitting coupling 1' on the operator platform structure 106 to the elements "holding legs 2" and "passage opening 50" on the machine frame 103 are the two holding or support legs 4, which project downward from the bottom side of the operator platform structure 106. These are each arranged overlapping one holding leg 2 in the vertical direction and also have, in addition to a contact surface 52, a stop or engagement lug 53, which is guided through the passage opening 50 in the horizontal plane or substantially transversely to the lifting direction c. Overall, the two stop lugs 53 therefore extend like two fork tines to one another, which protrude through the passage openings 50 in the front plate 51 of the machine frame 103 in the travel direction a and terminate nearly flush with the front plate 51. FIG. 6b illustrates that the passage openings 50 are designed with respect to their width (horizontally transversely to the travel direction a) and height (extension in the vertical direction) to be larger than the stop lugs 53, so that the stop lugs 53 can be moved without contact in relation to the inner edge of the passage openings 50 within a specific range. This is desirable in working operation of the construction machine, for example, if vibration decoupling is to be achieved between the operator platform structure 106 and the machine frame 103 by the damping elements 117. The spacing is indicated by ΔH.

The mode of operation of this formfitting coupling 1' is described further by a consideration together of FIGS. 6a, 6b, 7a, and 7b. FIGS. 6a and 6b correspond to the situation shown in FIG. 5 (and in FIG. 1), in which the construction machine 100 stands on the ground and can be used in the present case, for example, for compaction work. FIGS. 7a and 7b, in contrast, relate to the transport situation, in which the construction machine is hitched via the transport shackle 115 on a lifting device, for example, on a crane, and therefore no longer stands with its drums on the ground. As already described above, the lifting is performed solely via the transport shackle 115 in accordance with a single-point suspension.

Fundamentally, the construction machine is ideally designed in such a manner that the machine center of gravity S in the horizontal plane lies in the perpendicular or at least as close as possible to the perpendicular to the transport shackle 115, to allow the most torque-free lifting possible of the construction machine 100. Upon lifting of the construction machine 100, the steering column 108, which is inclined slightly forward in the working position, first buckles by the angle α (in a vertical plane in the working direction a) to the rear, or the operator platform structure including steering column 108 buckles by this angle in relation to the machine frame 103 in its center, respectively. To illustrate this, the profile of the front side of the steering column 108 from FIG. 7a is indicated by a dotted line in FIG. 6a. A comparison of FIGS. 6a/6b with FIGS. 7a/7b illustrates that the operator platform structure 106 carries out a buckling movement in the arrow direction d in relation to the machine frame 103. Through this pivot movement of the steering column 108, the operator platform structure 106, which was previously mounted solely via the damping elements 117 (the front damping elements in the travel direction a are not visible here but are identical in their construction and arrangement to the embodiment shown in FIG. 2) on the machine frame 103, reaches the stop point in the region of the formfitting coupling 1', and is fixed in relation to the machine frame 103 upon a continuation of the lifting movement in the direction c. Specifically, an engagement of the formfitting coupling 1' occurs for this purpose, the operator platform structure 106 striking against the machine frame 103 at multiple points simultaneously. This is illustrated in particular in FIGS. 6b and 7b.

Through the buckling movement of the operator platform structure 106, the holding legs 4 also rotate together with their stop lugs 53 around a horizontal rotational axis transversely to the working direction a. Through this rotational movement, the stop lug 53 strikes with its top side, which forms the stop 21, against the stop 20 formed by the bottom side of the passage opening 50 in the machine frame 103. The special feature of the present embodiment of the formfitting coupling 1' is that the operator platform structure 106 additionally strikes with its holding legs 4 on the holding legs 2, specifically its top side 52, and therefore wedges the operator platform structure 106 in relation to the machine frame 103. The holding legs 2 on the machine frame and the holding legs 4 on the operator platform structure are therefore arranged in pairs overlapping one another or lying one over another in the vertical direction, so that the holding legs 2 can be supported on the holding legs 4 upon lifting of the construction machine 100.

Furthermore, it is essential that the holding legs 2 and 4 strike against one another in pairs simultaneously at multiple points. The total of three stop points per holding leg pair 2/4 between the operator platform structure 106 and the machine frame 103 in the present exemplary embodiment are indicated in FIG. 7*b* with I, II, and III. The traction force transmission from the operator platform structure 106 into the machine frame 103 occurs substantially at the stop 1. At the stop 1, the upper edge of the passage opening 50 (stop 20) rests on the top side of the stop lugs 53 (stop element 21). In the case of the stops II and III, one holding leg 2 of the machine frame 103 respectively presses with its top side against the respective bottom side of one holding leg 4 of the operator platform structure, which is induced by the relative tilting movement of the operator platform structure 106 in this region in relation to the machine frame 103. A tilt limit, which delimits the pivot distance of the machine frame 106 in relation to the operator platform structure 103, is thus obtained by the stops II and III, which are designed like a counter bearing or tilt stop. Inaccuracies in the mass center of gravity location of the construction machine 100 can thus be compensated for very efficiently upon lifting. Simultaneously, the operator platform structure 106 is prevented from slipping out of the machine frame 103 or the elements of the formfitting coupling 1' are prevented from slipping via the stops II and III.

If the construction machine 100 is put back down onto the ground, the formfitting coupling 1' automatically disengages. The mounting of the operator platform structure 106 is then performed again solely via the damping elements 117. In contrast, the holding legs 2 and 4 are spaced apart from one another by the distance ΔH in the vertical direction, so that a vibration damping of the machine frame 103 to the operator platform structure 106 is ensured via the damping elements 117. For this purpose, in particular the stop lugs are also spaced apart peripherally to the inner edge of the passage opening 50 and protrude without contact through the passage opening 50.

Moreover, it is obvious that the elements of the formfitting coupling 1' can also be exchanged, of course, in relation to the machine frame 103 and the operator platform structure 106, for example. What is decisive is that a travel limit, ideally via a formfitting coupling, is provided via which a traction relief or the avoidance of an overload of the damping elements 117 is achieved upon lifting of the machine via the steering column 108.

While the present invention has been illustrated by description of various embodiments and while those embodiments have been described in considerable detail, it is not the intention of Applicant to restrict or in any way limit the scope of the appended claims to such details. Additional advantages and modifications will readily appear to those skilled in the art. The invention in its broader aspects is therefore not limited to the specific details and illustrative examples shown and described. Accordingly, departures may be made from such details without departing from the spirit or scope of Applicants' invention.

What is claimed is:

1. A construction machine, comprising a machine frame and an operator platform structure which is vibration-decoupled in relation to the machine frame using at least one damping element, and a hitch device for lifting the construction machine, the hitch device being arranged on the operator platform structure, wherein, a travel limiting device is provided, which is implemented in such a manner that, upon lifting of the construction machine via the hitch device, the travel limiting device limits the load of the at least one damping element, prevents excess traction load of the at least one damping element upon lifting of the construction machine, and allows a direct force flow between the operator platform structure and the machine frame.

2. The construction machine according to claim 1, wherein the travel limiting device comprises a formfitting coupling which is active between the vibration-decoupled operator platform structure and the machine frame, and which allows the direct force flow between the operator platform structure and the machine frame upon lifting of the construction machine via the hitch device.

3. The construction machine according to claim 2, wherein the formfitting coupling has at least one first stop and at least one second stop which are formed in relation to one another in such a manner that the at least one first stop strikes against the at least one second stop upon lifting of the construction machine and prevents a further relative movement of the operator platform structure to the machine frame in a lifting direction (c).

4. The construction machine according to claim 2, wherein the formfitting coupling comprises at least one stop on the operator platform structure and at least one stop on the machine frame.

5. The construction machine according to claim 3, wherein the at least one second stop is a stop bolt, which comes into contact on the at least one first stop upon lifting of the construction machine, with a holding leg having a bolt passage opening being arranged on the operator platform structure and a holding leg having a bolt passage opening being arranged at least partially overlapping on the machine frame, and that the stop bolt is guided through both bolt passage openings in such a manner that it presses against the edge of the two bolt passage openings upon lifting of the construction machine.

6. The construction machine according to claim 5, wherein the bolt axis of the stop bolt extends perpendicularly to the force direction of a lifting force (F).

7. The construction machine according to claim 1, wherein the travel limiting device comprises at least one first stop on the machine frame and at least one second stop on the operator platform structure which are designed to at least partially overlap one another in the lifting direction.

8. The construction machine according to claim 1, wherein the travel limiting device has a first stop in the form of a passage opening in the machine frame and a second stop in the form of a stop lug on the operator platform structure, the stop lug protruding at least partially into the passage opening essentially transversely to a lifting direction of the construction machine.

9. The construction machine according to claim 1, wherein the elements of the travel limiting device are formed in one piece with the operator platform structure and the machine frame.

10. The construction machine according to claim 1, wherein the travel limiting device comprises at least one tilt limit which limits a tilting movement of the operator platform structure relative to the machine frame.

11. The construction machine according to claim 1, wherein the hitch device is a transport shackle which is fastened on the vibration-decoupled operator platform structure.

12. The construction machine according to claim 1, wherein the hitch device is arranged on a steering support column connected to the operator platform structure and/or the hitch device is arranged so as to be pivotable and/or foldable on the operator platform structure.

13. The construction machine according to claim 1, wherein the construction machine is a tandem roller having an operating weight of up to 5.0 tons.

14. The construction machine according to claim 1, wherein the construction machine comprises a road construction machine.

15. The construction machine to claim 12, wherein the hitch device is a transport shackle.

16. The construction machine of claim 12, wherein the hitch device is arranged so as to be pivotable and/or foldable on the steering column.

17. The construction machine of claim 1 wherein the construction machine is a tandem roller having an operating weight of up to 6.0 tons.

* * * * *